UNITED STATES PATENT OFFICE.

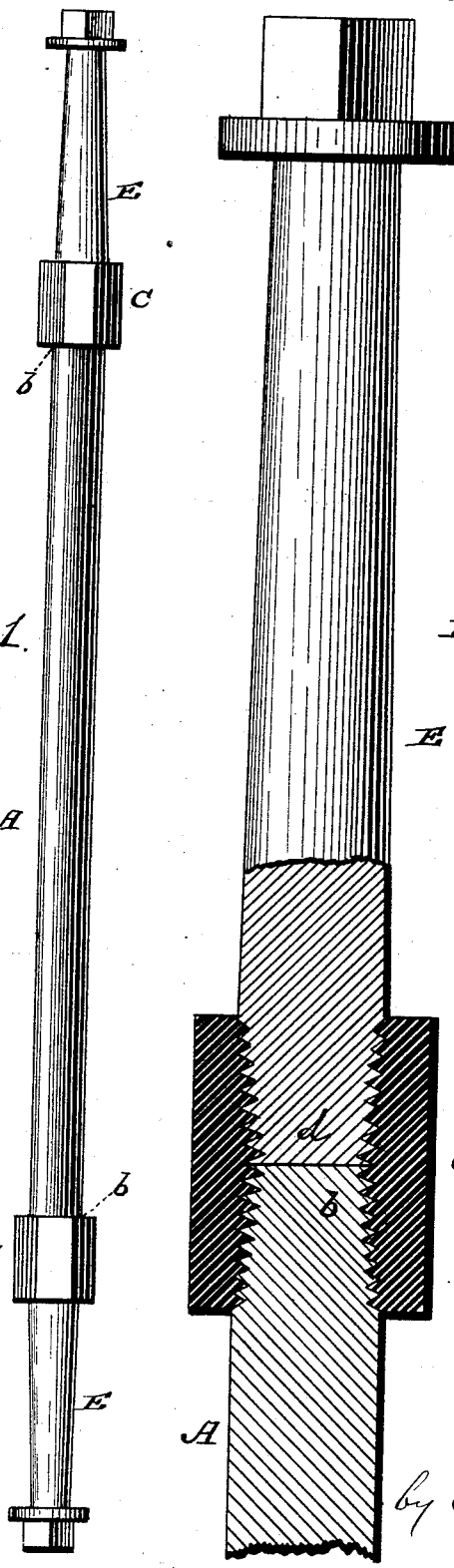

AUGUSTUS E. SUELL, OF FRANKLIN, KENTUCKY, ASSIGNOR OF TWO-THIRDS TO JOHN B. MONTAGUE AND J. TOMS BOOKER, OF SAME PLACE.

WAGON-AXLE.

SPECIFICATION forming part of Letters Patent No. 314,981, dated March 31, 1885.

Application filed July 12, 1884. (No model.)

*To all whom it may concern:*

Be it known that I, AUGUSTUS E. SUELL, a citizen of the United States, residing at Franklin, in the county of Simpson and State of Kentucky, have invented certain new and useful Improvements in Wagon-Axles; and I do declare the following to be a full, clear, and exact description of the invention, such as will enable others skilled in the art to which it appertains to make and use the same, reference being had to the accompanying drawings, and to letters or figures of reference marked thereon, which form a part of this specification.
Figure 1 of the drawings is a plan view of my axle, and Fig. 2 is also a plan view of the same, partly in section.

This invention has relation to axles; and it consists in the construction and novel arrangement of parts, as hereinafter set forth, and pointed out in the appended claims.

In the accompanying drawings, the letter A designates the body of the axle, which may be made in any approved form. It is provided with threaded ends $b$, the direction of the thread at each end corresponding to the direction in which the wheel turns, so that there will be no liability of detachment of the union-nuts C, which are applied to said threaded ends.
It is preferred that these threads should be graduated in depth, being shallower toward the middle portion of the axle, so that the surface of the axle will not be materially weakened at the ends of the thread. The nut C is threaded to conform to the threaded end of the axle, and is made of sufficient thickness to be turned home thereon, and also to receive the threaded end $d$ of the spindle E. The spindle E is of the usual form, except that it is provided with a thread, $d$, at its inner end running in the direction of motion of the wheel, which is applied on said spindle. The threaded end of the spindle is designed to be screwed home into the union-nut C, and is then ready to receive the wheel. The nut C is designed to serve the purpose of a shoulder on the axle for the inner bearing of the wheel-hub, and its outer face is therefore in a plane at right angles to the axial line of the spindle. The inner threaded end of the axle should also be formed upon the axial line of the hub-bearing portion of the spindle, in order that the nut shall have the proper set as a shoulder on the axle.

It is designed by this invention to facilitate the replacement of spindles when worn. The old spindles can be readily detached and new ones applied to the axle ends. In the construction it is advisable to have the threaded ends of the spindle and axle long enough to abut against each other, as a brace is obtained in this way, which materially adds to the strength of the construction.

Having described this invention, what I claim, and desire to secure by Letters Patent, is—

1. The combination of an axle-tree having its ends threaded, removable spindles having their engaging ends also threaded, and a nut for uniting the same, adapted to serve as a stop for the inward movement of the wheels, substantially as specified.

2. The combination, with an axle having its ends threaded in the direction of rotation of the wheels, of the spindles having their inner ends threaded, and union-nuts connecting said spindles to the axle ends, and forming the axle-shoulders for the inner bearings of the wheel-hubs, substantially as specified.

In testimony whereof I affix my signature in presence of two witnesses.

AUGUSTUS E. SUELL.

Witnesses:
S. N. FORLINE,
MARION WEBB.